Aug. 16, 1949.  J. J. TOOLEY  2,479,279
MOTOR WHEEL

Filed Dec. 23, 1947  2 Sheets-Sheet 1

Inventor
JAMES J. TOOLEY,
By Robert G. Pierce
Attorney

Aug. 16, 1949.   J. J. TOOLEY   2,479,279
MOTOR WHEEL

Filed Dec. 23, 1947   2 Sheets-Sheet 2

Inventor
JAMES J. TOOLEY,
By Robert G. Pierce
Attorney

Patented Aug. 16, 1949

2,479,279

UNITED STATES PATENT OFFICE 2,479,279

MOTOR WHEEL

James J. Tooley, Asher, Okla., assignor of one-tenth to Frank M. Keen, Shawnee, Okla.

Application December 23, 1947, Serial No. 793,554

13 Claims. (Cl. 172—287)

1

This invention relates to electric motor driven landing wheels for aircraft and more specifically to electric motors incorporated with aircraft landing wheels for the purpose of rotating the wheels prior to landing.

It is an object of this invention to provide an electric motor driven landing wheel which may be rotated to ground speed prior to landing, and to provide pilot control means for varying the speed of rotation for any given set of conditions.

A further object of the invention is to provide an electric motor driven landing wheel which may be incorporated in standard landing gear without requiring radical changes therein.

As a further object of this invention, it is proposed to provide an electric motor for electrically driven aircraft landing wheels, the electric motor incorporating an improved electric motor brush holder and mounting therefor.

A still further object of this invention is to provide a governor control for the electric motor, together with means for overriding the governor if desired.

A still further object of this invention is to provide an improved electric motor driven landing wheel having detachable tire flanges whereby the tire may be quickly removed from or replaced on the wheel rim.

Other and further objects and advantages of this invention will become more apparent from a consideration of the following specification, when read in the light of the accompanying drawing, in which:

Figure 4 is a diagrammatic view of the electric circuit.

Figure 1:
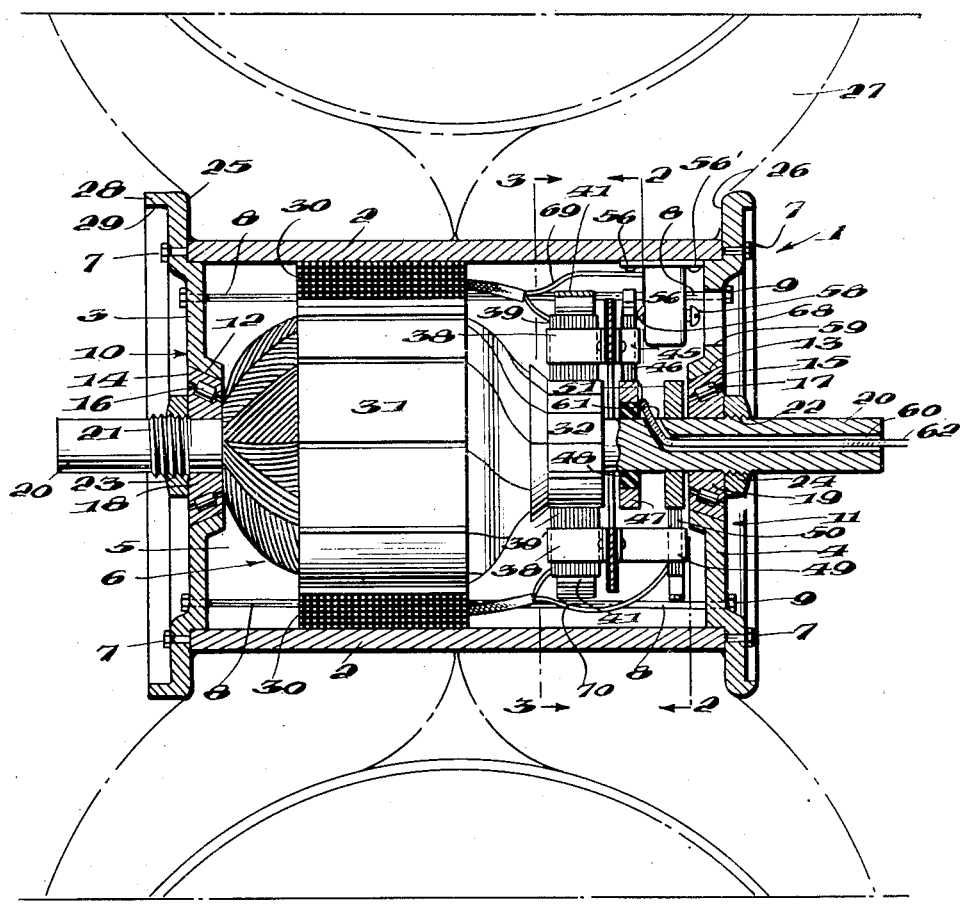
Figure 1 is a cross-sectional view, partly in elevation, taken on the longitudinal axis of the airplane wheel spindle.

Referring now more specifically to the drawings, reference numeral 1 indicates, in general, a disc type airplane wheel, constructed according to this invention. The wheel comprises an elongated cylindrical rim 2, the opposite ends of which are provided with closure hub plates 3 and 4, respectively, to form a chamber 5 for the electric driving motor indicated, in general, by the reference character 6. The closure hub plates 3 and 4 are detachably secured to the rim 2 by a plurality of stud bolts 7 and to each other by a plurality of elongated bolts 8 capped by nuts 9.

The closure hub plates 3 and 4 include hub portions 10 and 11, each of which is centrally apertured at 12 and 13 to receive bearing races 14 and 15. Bearings 16 and 17 ride between races 14 and 15 and bearing races 18 and 19 mounted on spindle 20. It is understood, of course, that the bearing assemblies are coaxially aligned.

Each end of spindle 20 is threaded at 21 and 22 adjacent the bearing assemblies and cooperate with lock nuts 23 and 24 to maintain the bearing assemblies in their respective positions and simultaneously coact to prevent spindle 20 from shifting in the direction of its axis. As seen in Fig. 1, the opposite ends of spindle 20 project laterally beyond the exterior surfaces of closure hub plates 3 and 4 and are not threaded in order to provide bearing surfaces adapted to be journalled in the landing gear (not shown) of an aircraft.

Each closure hub plate 3 and 4 has a peripheral flange 25 and 26, respectively, to retain a pneumatic tire 27 on the rim 2. Closure hub plate 3 is also provided with an integrally formed laterally projecting shoulder 28, having an inner brake drum surface 29 adapted to cooperate with an internal brake shoe (not shown), the elements coacting to comprise a brake of the type well known in the art.

A plurality of electro-magnetic field coil units 30 are positioned within chamber 5 and are rigidly secured to rim 2 at spaced intervals, in any suitable manner. As seen in Fig. 1, the units project radially from rim 2 toward an armature 31 fixedly mounted on spindle 20. The armature 31 is provided with the usual commutator 32.

A substantially circular, metallic brush support 33, having a plurality of radially extending, spaced arms 34 provided with feet 35 is secured to the rim 2 by screws 36. Support 33 is centrally apertured at 37 whereby it may be mounted for rotation with rim 2 about spindle 20. As seen in Fig. 1, support 33 is positioned adjacent the commutator 32.

Figure 3:
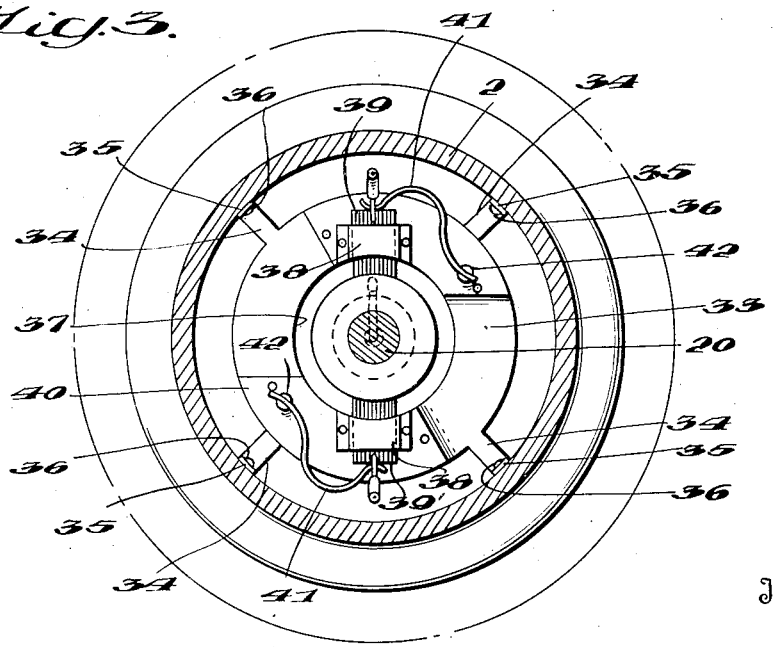
Figure 3 is a cross-sectional view, partly in elevation, taken on the line 3—3 of Fig. 1.

From one side of support 33 project a pair of diametrically positioned brush holders 38 in which are slidably mounted brushes 39, 39'. Brush holders 38 are electrically insulated from support 33 by way of dielectric segments 40. As seen in Fig. 3, the brushes 39 and 39' are constantly urged toward commutator 32 by leaf springs 41 mounted in pins 42 which are secured to the dielectric segments 40.

Figure 2:
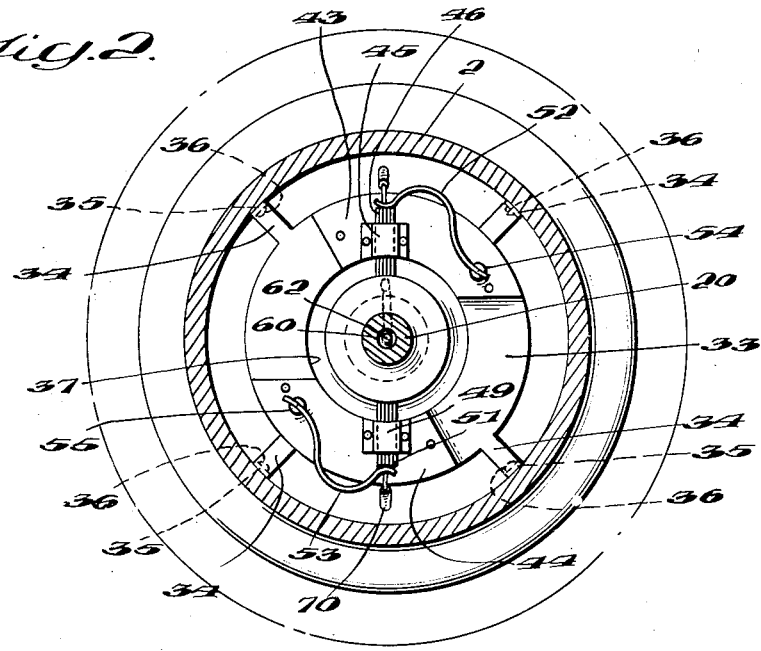
Figure 2 is a cross-sectional view, partly in elevation, taken on the line 2—2 of Figure 1.

The other side of the support 33 (see Fig. 2) is provided with a pair of diametrically opposed dielectric segments 43 and 44. A brush holder for brush 46 is fixedly mounted on dielectric segment 43. Brush 46 engages the periphery of collector ring 47 which is electrically insulated at 48 from spindle 20 on which it is fixedly secured. This side of support 33 also carries a second brush holder 49 diametrically opposite brush holder 45 but projecting from support 33 a distance greater than the distance from support 33 to collector ring 47, whereby brush 50 mounted in brush holder 49 may engage metal collector ring 51, rigidly mounted on spindle 20. Leaf springs 52 and 53 are mounted in pins 54 and 55, respectively, carried on dielectric segments 43 and 44, respectively, engage brushes 46 and 50 and constantly urge them towards their respective collector rings.

A centrifugal governor 56 is fixed to rim 2 by screws 56' and is disposed within chamber 5 (see Fig. 1). Governor 56 is provided with an overriding shunt switch 57 (see Fig. 4) manually actuated by set screw 58 (see Fig. 1) which may be reached by the operator through slot 59 formed in closure hub plate 54. The spindle 20 is provided with an axial bore 60 extending inwardly from the commutator end thereof and a connecting transverse bore 61, the bores receiving the electrically insulated wire 62.

Wire 62 (see Fig. 1) has one of its ends connected with the collector ring 47, while the other end thereof connects to the variable arm 63 of a rheostat 64, the rheostat being positioned within the pilot's cockpit. The rheostat has its resistance 65 connected to one side of a battery 66, the other side of which is grounded at 67 to the plane.

From collector ring 47 (see Fig. 4), current passes through brush 46, wire 68 to governor 56. From governor 56, current is further conducted through wire 69 to brush 39 and commutator 32 to armature 31, and also to the field coil units 30. After passing through field coil units 30, armature 32 and brush 39', wire 70 conducts the current to collector ring 51 through brush 50. Collector ring 51 is electrically as well as mechanically connected with spindle 20 and the latter is grounded at 72 through the airplane landing gear (not shown) to complete the electrical circuit.

While from the foregoing specification the operation of this device is believed to be manifest, a brief description of its operation will be given.

Prior to flight, the pilot will determine if the governor 56 is to be operative or rendered inoperative. If the decision is to the effect that the governor is to be inoperative, set screw 58 is turned to close shunt switch 57 and by-pass the governor; if, on the other hand, the governor is to be permitted to be operative, set screw 58 is turned to open shunt switch 57. Rheostat arm 63, while the plane is grounded and during normal flight, remains in its off position, as shown in dotted lines in Fig. 4, thereby breaking the electrical circuit.

Assuming now that the plane has been in flight and is preparing to land, the pilot actuates rheostat arm 63 to close the electric circuit, whereby motor 6 is energized causing the wheel 1 to rotate about spindle 20 and achieve a speed corresponding to the ground speed of the aircraft.

If wheel 1 rotates at an excessive speed, and assuming the governor 56 to be operative, the governor will be actuated to break the electric circuit, thereby deenergizing motor 6. The deenergization of motor 6 will, of course, cause the speed of the rotation of wheel 1 to be diminished. When wheel 1 regains its normal speed, governor 56 will again become operative and will be so actuated as to complete the electric circuit and energize motor 6. Under this condition, the pilot has, of course, control of the speed of rotation of wheel 1 at all speeds less than the critical speed for which governor 56 has been set. It is obvious that if the governor 56 had been short-circuited as referred to above, the pilot must necessarily control the speed of the rotation of wheel 1 by the manual operation of rheostat 64.

Particular attention should also be given to the physical structure of rim 2 and closure hub plates 3 and 4. As seen in Fig. 1, rim 2 is cylindrical in form and is adapted to receive tire 27 which is, in turn, clamped between flanges 25 and 26. Removal of the tire for replacement or repair from either side of the wheel 1 is effected merely by detaching one of the closure hub plates from rim 2, thereby permitting the tire to be slid off the rim in the direction of the axis of spindle 20. This is a feature heretofore unknown in this art.

To facilitate assembly of the closure plates 3 and 4 on wheel 1, closure plates 3 and 4 are first secured in their respective positions by means of the elongated bolts 8, after which stud bolts 7 are employed to secure the closure hub plates to rim 2.

Having described one embodiment of this invention in detail, it is to be understood that the same has been offered by way of example and that the invention is to be limited only by the scope of the following claims.

I claim:

1. An airplane landing wheel comprising in combination with a spindle, a hollow cylindrical rim, a closure hub plate for each end of said rim thereby forming a substantially closed chamber, means securing said hub plates to said rim, means carried by said hub plates for supporting said spindle at its opposite ends, driving means positioned within said chamber for rotating said rim about said spindle, a centrifugal governor fixedly mounted on said rim and positioned within said chamber, said governor controlling said driving means to render it inoperative when the speed of rotation of said rim exceeds a predetermined value.

2. An airplane landing wheel comprising in combination with a spindle, a hollow cylindrical rim, a closure hub plate for each end of said rim thereby forming a substantially closed chamber, means securing said hub plates to said rim, means carried by said hub plates for supporting said spindle at its opposite ends, an electric circuit including an electric motor for driving said rim about said spindle, and speed control means for said electric motor, said electric motor being disposed within said chamber.

3. An airplane landing wheel as defined in claim 2, and centrifugal control means for deenergizing said motor when the speed of rotation of said rim exceeds a predetermined value.

4. An airplane landing wheel comprising in combination with a spindle, a hollow cylindrical rim, an electric motor comprising a plurality of electromagnetic field coil units disposed therein and fixedly mounted thereon at spaced intervals, an armature fixedly secured on said spindle, said field coil units projecting radially from said rim toward said armature, a commutator for said armature rigidly affixed to said spindle, a pair of brushes for said commutator, a brush holder secured to said rim for rotation about said spindle, a metallic collector ring fixedly mounted on said spindle, said collector ring being electrically insulated from said spindle, a third brush carried by said brush holder and engaging said collector ring, a second metallic ring electrically and mechanically connected to said spindle, a fourth brush carried by said brush holder and engaging said last named collector ring, means for supporting said rim for rotation about said spindle, and means associated with said brushes for energizing said armature and said field coil units whereby said rim is driven to rotate about said spindle.

5. An airplane landing wheel as defined in claim 4, said means for supporting said rim for rotation comprising a pair of closure hub plates, each of said hub plates being secured to one end of said hollow cylindrical rim, each of said hub plates having aligned central openings formed therein, and means in each of said apertures forming journals for the opposite ends of said spindle.

6. An airplane landing wheel as defined in claim 4, and a centrifugal governor disposed within said rim and secured thereto, said governor deenergizing said motor when the speed of said rim exceeds a predetermined value.

7. An airplane landing wheel as defined in claim 4, and manually actuated means for controlling the speed of said motor.

8. An airplane landing wheel comprising in combination with a spindle, a hollow cylindrical rim, a disc-shaped hub plate for each end of said rim, said spindle extending longitudinally through said hollow cylindrical rim and having its axis coincident with the axis of rotation of said rim, means in each of said closure hub plates supporting opposite ends of said spindle, whereby said rim and said hub plates may rotate about said spindle, a plurality of radially spaced elongated bolts extending longitudinally through said hollow rim and having their respective longitudinal axes parallel to the axis of said spindle, an electric motor for driving said rim around said spindle, said motor being positioned within said hollow cylindrical rim and positioned between said closure hub plates, a source of E. M. F. having one of its ends grounded, the other side of said source being grounded through a rheostat and said electric motor, and means detachably securing said closure hub plates to each end of said rim.

9. An airplane landing wheel comprising in combination with a spindle, a hollow cylindrical rim, a disc-shaped closure hub plate for each end of said rim thereby forming a chamber, means detachably securing said closure hub plates to each end of said rim, means carried by said closure hub plates forming journals for the opposite ends of said spindle whereby said rim and said closure hub plates may rotate thereabout, an electric motor mounted in said chamber for driving said rim about said spindle, said spindle having a coaxial longitudinal bore formed therein adjacent one of its ends and a transverse bore connected with said longitudinal bore, a series electric circuit including a source of E. M. F. having one of its sides grounded to said spindle, a wire disposed within said passages and electrically insulated therefrom, said wire having one of its ends connected with the other side of said source of E. M. F., the other end of said wire being connected with one side of said motor, and the other side of said motor being grounded to said spindle to complete said circuit.

10. An airplane landing wheel as defined in claim 9, and a rheostat connected in said series circuit for controlling the speed of rotation of said motor.

11. An airplane landing wheel as defined in claim 9, and a centrifugal governor fixedly mounted on said rim for controlling said electric motor.

12. An airplane landing wheel as defined in claim 10, and a centrifugal governor fixedly mounted on said rim within said chamber, said centrifugal governor actuated to deenergize said electric motor when said rim exceeds a predetermined value, a manually actuated shunt switch mounted on said governor for rendering the same inoperative, one of said closure hub plates having an aperture formed therein whereby the operator may actuate said shunt switch.

13. An airplane landing wheel comprising in combination with a spindle, a hollow cylindrical rim, a closure hub plate for each end of said rim thereby forming a closed chamber, means detachably securing said hub plates to said rim, means carried by said hub plates for supporting said spindle, means disposed within said chamber for rotating said rim about said spindle, and means mounted on said rim for rendering said last named means inoperative when the speed of rotation exceeds a predetermined value.

JAMES J. TOOLEY.

REFERENCES CITED

The following references are of record in the file of this patent:

UNITED STATES PATENTS

| Number | Name | Date |
|---|---|---|
| 552,271 | Bolton | Dec. 31, 1895 |
| 1,093,149 | Schneider | Apr. 14, 1914 |
| 1,968,005 | Swain | July 24, 1934 |
| 2,017,076 | Sauzedde | Oct. 15, 1935 |
| 2,059,281 | Sauzedde | Nov. 3, 1936 |
| 2,230,193 | Shinn | Jan. 28, 1941 |
| 2,335,398 | Downey | Nov. 30, 1943 |